United States Patent [19]

Dardi et al.

[11] 4,447,503

[45] * May 8, 1984

[54] SUPERALLOY COATING COMPOSITION WITH HIGH TEMPERATURE OXIDATION RESISTANCE

[75] Inventors: Louis E. Dardi; Srinivasan Shankar, both of Muskegon, Mich.

[73] Assignee: Howmet Turbine Components Corporation, Greenwich, Conn.

[*] Notice: The portion of the term of this patent subsequent to Jul. 13, 1999 has been disclaimed.

[21] Appl. No.: 249,502

[22] Filed: Mar. 31, 1981

Related U.S. Application Data

[63] Continuation-in-part of Ser. No. 145,460, May 1, 1980, Pat. No. 4,339,509, and Ser. No. 67,097, Aug. 16, 1979, Pat. No. 4,313,760, which is a continuation-in-part of Ser. No. 43,146, May 29, 1979.

[51] Int. Cl.³ .............................................. B32B 15/04
[52] U.S. Cl. .................................. 428/632; 428/636; 428/639; 428/656; 428/678; 428/937
[58] Field of Search ............... 428/629, 639, 632, 633, 428/656, 678–685, 937, 636

[56] References Cited

U.S. PATENT DOCUMENTS

| 4,013,424 | 3/1977 | Wildgoose et al. ................. 428/680 |
| 4,095,003 | 6/1978 | Weatherly et al. ................. 428/939 |
| 4,124,737 | 11/1978 | Wolfa et al. ......................... 428/679 |
| 4,219,592 | 8/1980 | Anderson et al. .................. 428/678 |
| 4,314,007 | 2/1982 | Gessinger ........................... 428/680 |
| 4,339,509 | 7/1982 | Dardi et al. ......................... 428/639 |

FOREIGN PATENT DOCUMENTS

| 1259157 | 1/1972 | United Kingdom . |
| 1262757 | 2/1972 | United Kingdom . |
| 2042393 | 2/1979 | United Kingdom . |
| 2033925 | 5/1980 | United Kingdom . |

OTHER PUBLICATIONS

Sims, C. T., et al., *The Superalloys*, pp. 490 to 495, John Wiley & Sons, (1972).

*Primary Examiner*—Michael L. Lewis
*Attorney, Agent, or Firm*—Finnegan, Henderson, Farabow, Garrett & Dunner

[57] ABSTRACT

Coatings for iron-, nickel- and cobalt-base superalloys and the resulting coated components having good high temperature oxidation resistance. The coatings consist essentially of, by weight, 5% to 50% chromium, 3% to 30% aluminum, 0.01% to 15% tantalum, up to 10% manganese, up to 5% tungsten, up to 12% silicon, up to 10% hafnium, up to 5% reactive metal from the group consisting of lanthanum, yttrium, and other rare earth elements, up to 5% of rare earth and/or refractory metal oxide particles, and the balance selected from the group consisting of nickel, cobalt and iron, and combinations thereof. Additions of titanium up to 5% and noble metals up to 15% are also contemplated.

37 Claims, 3 Drawing Figures

SUPERALLOY COATING COMPOSITION WITH HIGH TEMPERATURE OXIDATION RESISTANCE

RELATED APPLICATIONS

This application is a continuation-in-part of applicants' copending application Ser. No. 145,460, filed May 1, 1980, and entitled "Superalloy Coating Composition with Oxidation and/or Sulfidation Resistance," now U.S. Pat. No. 4,339,509 and of copending application Ser. No. 67,097, filed Aug. 16, 1979, and entitled "Superalloy Coating Composition," now U.S. Pat. No. 4,313,760 which is a continuation-in-part of application Ser. No. 43,146, filed May 29, 1979, and entitled "High Temperature Oxidation and Sulfidation Resistant Coating."

BACKGROUND OF THE INVENTION

This invention is concerned with coatings adapted to significantly improve the elevated temperature oxidation resistance of articles composed of iron-, cobalt- or nickel-based superalloys whereby more satisfactory performance and longer life for such articles can be obtained.

Elevated temperature exposure of metal articles is experienced in many situations. Metal components are subjected to such conditions, for example, in various aerospace applications and in land and marine operations such as in the case of blades, vanes, seals and other components utilized in gas turbine engines.

In such applications, it is important to provide some means for preventing undue oxidation of the components involved since such corrosion can materially shorten the useful life of the components. Deterioration of components can also create significant performance and safety problems.

Various alloys, including most superalloys, are characterized by a degree of corrosion resistance, but such resistance is significantly decreased when unprotected superalloy components are exposed at the operating temperatures involved in certain systems. For that reason, such components have been provided with coatings, such as aluminide coatings, which increase the corrosion resistance at elevated operating temperatures.

Aluminide coatings are applied by methods such as the pack cementation process. In this process, the substrate chemistry and the processing temperature exert a major influence on coating chemistry, thickness, and properties. Specifically, the coatings comprise a hard, brittle outer layer and a hard, brittle multi-phase sublayer that can crack when subjected to mechanically or thermally induced strain. This leads to poor fatigue properties, and cracks can also materially reduce the corrosion resistance of the coated components.

Another class of coatings is the MCrAlY overlay coatings, where M stands for a transition metal element such as iron, cobalt, or nickel. MCrAlY coatings have been shown to have an advantage over aluminide coatings in providing extended life to turbine components. Specifically, McAlY coatings generally demonstrate greater corrosion resistance than aluminide coatings and also greatly superior ductility.

Presently, these MCrAlY coatings are applied by vacuum physical vapor deposition. However, the fundamental nature of the vacuum physical vapor deposition process limits the composition of the coating that can be applied to an article. Specifically, with a single multi-element source, it is very difficult to deposit MCrAlY type coatings which contain other elements that have either very low or very high vapor pressures. Resorting to dual or multiple sources introduces a further degree of complexity to an already complex process, which is undesirable from a production standpoint.

Another technique of applying MCrAlY coatings is plasma spraying. In plasma spraying, the heated alloy particles corresponding to the desired coating composition are impinged on the preheated surface of the metal article at very high velocity and temperature. Such particles, upon contact with the metal article surface or with other applied particles, deform plastically and fuse and bond to the surface or to the other applied particles, thus producing a dense and adherent coating. Plasma spraying is particularly desirable since it is a generally less costly technique for producing the overlay coating and is not restricted by vapor pressure limitations as is the case with the vacuum physical vapor deposition processes.

Other attempts at improving elevated temperature corrosion resistance are described in U.S. Pat. No. 4,145,481, issued on Mar. 20, 1979. This process involves the application of MCrAlY coating over a substrate to provide an overlay, and the addition of an aluminide coating as an outer layer. This technique attempts to achieve the advantages of the ductility of the MCrAlY and the resistance to elevated temperature corrosion of the aluminide. Copending application Ser. No. 847,253, filed on Oct. 31, 1977, takes the approach of utilizing first and second MCrAlY-type coatings on a substrate. A first coating is intended to provide a ductile layer, with the second coating providing a layer having a greater resistance to elevated temperature corrosion.

Still other approaches, particularly from the standpoint of alloying ingredients and application techniques, are described in the following U.S. patents:

| Inventor | U.S. Pat. No. | Date of Issue |
| --- | --- | --- |
| Gedwill et al | 3,849,865 | November 26, 1974 |
| Gedwill et al | 3,869,779 | March 11, 1975 |
| Hecht et al | 3,928,026 | December 23, 1975 |
| Bessen | 3,957,454 | May 18, 1976 |
| Preston | 4,005,989 | February 1, 1977 |

In view of the increasingly greater demands placed on performance, particularly for components subject to extreme temperature conditions, it is desirable to provide even greater improvements in the capabilities of coatings of the type described. The demand for achieving resistance to the corrosive effects of temperature and atmosphere is particularly critical at very high temperatures (more than 1800° F.).

SUMMARY OF THE INVENTION

The coating compositions of this invention are particularly resistant to oxidation at elevated temperatures, are otherwise highly efficient in their performance at these temperatures, and are well suited for application to substrates by plasma spraying. These compositions are intended for applications where the need for improved high temperature oxidation resistance is paramount and coating ductility is relatively unimportant. In the case of gas turbine engine blades and vanes, for example, this generally pertains to uncooled components or parts operating at a temperature sufficiently high that the high tensile strains to which the coatings are subjected occur above their ductile to brittle transition temperature.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the coating composition of the invention consists essentially of, by weight, 3% to 30% aluminum, 0.01 to 15% tantalum, 5% to 50% chromium, up to 10% manganese, up to 5% tungsten, up to 12% silicon, up to 10% hafnium, and the balance selected from the group consisting of nickel, cobalt, and iron and combinations thereof.

When the balance of the coating composition of the present invention is constituted by nickel, the preferred composition consists essentially of 5 to 35% cobalt, 3 to 25% aluminum, 0.01 to 15% tantalum, 5% to 35% chromium, up to 10% manganese, up to 5% tungsten, up to 12% silicon, up to 10% hafnium, and the balance nickel.

When the balance of the coating composition of the present invention is constituted by cobalt, the preferred composition consists essentially of 3 to 25% aluminum, 0.01 to 12% tantalum, 5 to 40% chromium, up to 10% manganese, up to 5% tungsten, up to 12% silicon, up to 10% hafnium, and the balance cobalt.

Further in accordance with the purpose of the invention, as embodied and broadly described herein, the improvement of the invention comprises the aforesaid coating compositions in combination with and applied as a coating to a nickel, cobalt, or iron base superalloy component.

Optionally, the coating may have up to 5% by weight of a reactive metal selected from the group consisting of lanthanum, yttrium, and the other rare earths. Also the addition of rare earth or refractory metal oxide particles to the aforementioned coating composition is contemplated; these ingredients preferably being present in amounts up to about 5% by weight. Such additions can be beneficial to the overall protective response of the coating, because the metal oxide particles assist in pinning protective oxide scales. This pinning phenomenon results in superior adherence (less spalling) of the protective scale, thus increasing the overall coating life. Additions of titanium up to about 5% and of noble metals up to about 15% are also contemplated.

An especially preferred nickel-based coating composition includes 10 to 30% cobalt, 10 to 30% chromium, 10 to 20% aluminum, 1 to 10% tantalum, and 0.1 to 2% hafnium, up to 5% manganese, and up to 2% of a reactive metal selected from the group consisting of lanthanum, yttrium, and the other rare earths. This composition is especially useful as a coating for a superalloy substrate that is a single crystal or a directionally solidified substrate.

It will be appreciated that in using the term "coating," reference to application of material to a substrate surface is generally intended. Use of the material as an abradable sealing material is, for example, contemplated.

The accompanying drawings, which are incorporated in and constitute a part of this specification, illustrate several embodiments of the invention and, together with the description, serve to explain the principles of the invention.

DESCRIPTION OF THE PREFERRED EMBODIMENTS

Figure 1:
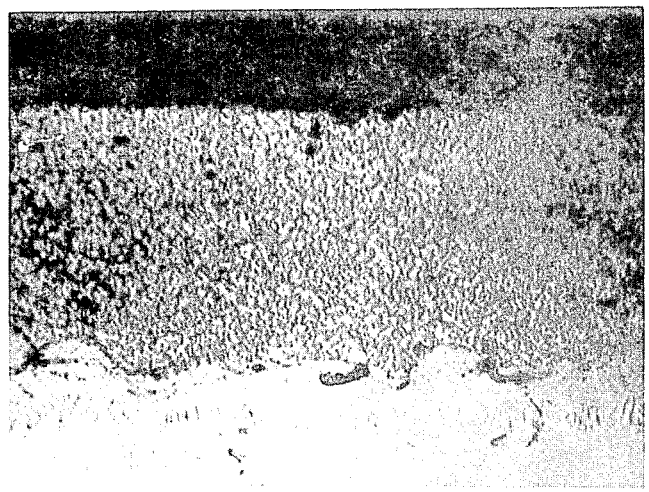
FIG. 1 comprises a 500× magnification of the microstructure of a coating and substrate particularly suited for performance at high temperatures.

Reference will now be made in detail to the presently preferred embodiments of the invention, examples of which are illustrated in the accompanying drawings.

As set forth in the foregoing summary, the invention relates to coating compositions for superalloy substrates and the resulting coated components. Protection against oxidation at very high temperatures (on the order of 1800° F. and higher) is particularly important and is exhibited by the coatings of this invention.

In accordance with the invention, the coating composition may contain unusually large amounts of aluminum (up to 30%) and tantalum (up to 15%). This is possible because, in applications where thermal and mechanical strains peak at very high temperatures (more than 1800° F.), low temperature (less than 1700° F.) ductility is not a critical factor. Thus, we have found that although ductility is reduced appreciably when the amount of aluminum and tantalum is raised to these levels, this is relatively unimportant for certain applications in which oxidation resistance is extremely important, and that oxidation resistance is significantly improved by providing such high amounts of aluminum and tantalum.

Thus, in accordance with the invention, the coating composition may contain 3% to 30% aluminum, preferably 10 to 20%, and still more preferably 12 to 17%. The coating composition may contain 0.01 to 15% tantalum, preferably 1 to 10%, and still more preferably 2 to 7%. Similarly, the coating composition may contain 5% to 50% chromium, preferably 10 to 40%, and still more preferably 15 to 20%.

For a nickel-based coating composition, the preferred range for cobalt is 5% to 35%, more preferably 10 to 30%, and still more preferably 15 to 25%; the preferred range for aluminum is 3% to 25%, preferably 10 to 20%, and still more preferably 12 to 17%; the preferred range for tantalum is 0.01 to 15%, more preferably 1 to 10%, and still more preferably 2 to 7%; the preferred range for chromium is 5% to 35%, more preferably 10 to 30%, and still more preferably 15 to 20%.

Exemplary ranges of nickel-base compositions include 5 to 35% cobalt, 6 to 8% aluminum, 1.5 to 3.5% tantalum, 32 to 35% chromium, 1.5 to 2% manganese, up to 5% tungsten, up to 12% silicon, up to 10% hafnium, up to 1.5% of a reactive metal selected from the group consisting of lanthanum, yttrium, and the other rare earths, and the balance nickel.

When the coating composition is cobalt-based, the preferred aluminum content is 3% to 25%, more preferably 10 to 20%, and still more preferably 12 to 17%; the preferred tantalum range is 0.01% to 12%, more preferably 1 to 10%, and still more preferably 2 to 7%; the preferred chromium content is 5% to 40%, preferably 10 to 30%; and still more preferably 15 to 20%.

Exemplary ranges of cobalt-base compositions include 8 to 10% aluminum, 2 to 4% tantalum, 28 to 30% chromium, 1.5 to 2% manganese, up to 5% tungsten, up to 12% silicon, up to 10% hafnium, up to 1.5% by weight of a reactive metal selected from the group consisting of lanthanum, yttrium, and the other rare earths, and the balance cobalt.

In the broadest aspect of this invention, manganese and tungsten are optional additions that may be present in amounts up to 10% and up to 5%, respectively. In a preferred embodiment, however, a metal mixture may be utilized in the coatings that consists of tantalum and at least one of tungsten and manganese. Tantalum should represent at least one-fifth by weight of the mixture and at least 0.5% of the total coating weight. The balance of the mixture preferably should include at least 0.5% manganese or tungsten or a combination thereof. Optional additions of silicon up to 12% by weight and of hafnium up to 10% by weight are also contemplated.

It has also been determined that the provision of manganese in amounts from 0.1 to 10% by weight, preferably 1% to 4% by weight, will impart excellent sulfidation resistance. Additions of tungsten up to 5% by weight are then contemplated, particularly where compatibility with respect to the chemistry and the thermal expansion coefficient of the substrate is required and the extent of interdiffusional interaction with the substrate must be minimized. In the case of the cobalt base alloy composition mentioned above, the tantalum is preferably present in amounts up to 12% by weight and the tungsten up to 5% by weight. The above mentioned additions of silicon and hafnium are also considerations for any of the compositions within the ranges described.

The various coatings described may include alloying elements for various purposes, for example up to 5% of a reactive metal selected from lanthanum, yttrium, and the other rare earths. In a preferred form of the invention, these elements are utilized in an amount between 1.0% to 3.0% by weight of the coating composition.

Up to 5% of rare earth or refractory metal oxide particles in amounts beneficial to the overall protective aspects of the coating are also contemplated because they assist relative to the pinning phenomenon. These additions are preferably in the range of 0.05% to 2.0% by weight.

A similar improvement in the coating life can be achieved by the addition of from about 0.05 to about 15 weight percent of a noble metal selected from the group consisting of platinum, rhodium, and palladium. An addition of this type also improves the diffusional stability of the coating.

Where the aforementioned metal mixture makes up a portion of the coating composition, it is generally preferred that the mixture contain between 2% and 5% tantalum along with between 2% and 5% of material comprising tungsten, manganese or a combination thereof. It has been found, however, that the amount of tungsten preferably does not exceed 1.5% by weight. The other ingredients of the coating composition of this type are preferably employed within the limits of, by weight, 10% to 20% cobalt, 5% to 25% chromium, 10% to 18% aluminum, up to about 2% silicon, and up to about 5% hafnium.

It is contemplated that the coating composition of this invention form the corrosion resistant outer layer of the two layer MCrAlY coating described in the aforementioned patent application Ser. No. 847,253.

The composition may also form the inner layer or the bond coat for a two-layer or graded thermal barrier coating which is used to reduce metal operating temperatures and the effects of thermal transients in gas turbine engines. In such applications, the bond coat must be similar to the substrate, and the composition of the ceramic/metallic two-layer or graded coating system must be such that stresses caused by thermal expansion mismatch between the bond coat and the compatible oxide outer layer are minimized. In addition, the inner layer must be fairly dense and the surface of this undercoat must be rough enough to provide an adherent surface for the oxide overcoat. Plasma sprayed compositions satisfy these requirements, and hence, are ideally suited for this application.

The above narrower composition ranges are best suited for higher temperatures although compositions within the broader ranges have utility at such temperatures. Specifically, higher chromium content is desirable in certain instances with from 5% to 50% by weight chromium being an appropriate range. The chromium content can be reduced when manganese is used in the higher percentages mentioned. Thus, manganese is useful in amounts up to 10% by weight for this additional purpose. Lower percentages of aluminum can be utilized and, therefore, an aluminum range from 3% to 30% is appropriate. Finally, titanium in amounts up to about 5% by weight is desirably included, while silicon in amounts from 5% to 8% by weight are preferred in some instances.

Other uses for the compositions of the invention will be apparent to those skilled in the art, and it will also be appreciated that other alloying elements may be employed in the coatings in accepted amounts and in accordance with known practices.

The utilization of plasma spray techniques to deposit the coating compositions is preferred. The wide differences in the evaporation rate (or vapor pressure) between high vapor pressure elements like manganese or aluminum and low vapor pressure elements like tantalum or tungsten make the deposition and composition control of this coating by vacuum physical vapor deposition difficult, if not impossible. In addition, compositions in accordance with this invention produce very dense coatings after plasma spraying. It will be appreciated, however, that process improvements or modifications in methods such as physical vapor deposition or ion plating could make coating by these methods possible, and the use of these methods is therefore contemplated. Additionally, techniques like sputtering or slurry sintering may also be considered.

After deposition of the coating, preferably in a thickness between 0.0001 and 0.1 inches, the coated articles preferably are subjected to an elevated temperature treatment in the range of 1900° F. to 2200° F. for a duration of one to ten hours in an inert atmosphere (for example, in a vacuum or in an argon atmosphere) to promote interfacial bonding.

To illustrate the practice of the invention, a typical nickel-base superalloy of the type used in gas turbine engines, known as IN738, and having a nominal composition of 0.09% C, 16.0% Cr, 8.5% Co, 1.7% Mo, 2.5% W, 1.7% Ta, 3.5% Ti, 3.5% Al, 0.01% B, 0.03% Zr, and the balance Ni, was provided as one substrate. A typical cobalt-base superalloy of the type used in gas turbine engines, known as Mar-M509 and having a nominal composition of 0.60% C, 23.4% Cr, 10.0% Ni, 7% W, 3.5% Ta, 0.23% Ti, 0.01% B, 0.45% Zr, 1.5% Fe, 0.10% Mn, 0.40% Si, and the balance Co, provided a second substrate for testing.

A first series of coatings was produced by plasma spraying prealloyed powders. These powders were sprayed in a plasma arc (>Mach 3 velocity) using argon and helium as primary and secondary gases, respectively. Spraying was performed in a chamber maintained at a dynamic pressure of 55 Torr. The process parameters were:

| | |
|---|---|
| Gun to workpiece distance | 16 in. |
| Primary gas (argon) | 370 CFH at 225 psi |
| Secondary gas (helium) | 150 CFH at 250 psi |
| Voltage | 50–52 volts |
| Current | 1400–1440 amps |
| Powder flow | 0.07 lb./min. |
| Carrier gas (argon) | 25 CFH at 100 psi |
| Time for deposition | 45 sec. |

The articles were then subjected to heat treatment in a vacuum for four hours at 1975° F.

The following table illustrates the compositions tested and the test results.

It is seen from Table I that coatings produced in accordance with this invention exhibit substantially improved performance compared to a simple MCrAlY type system (UTC NiCoCrAlY, Pat. No. 3,928,026). In addition, the corrosion resistance of the relatively low aluminum content material is similar to that of a very high aluminum content MCrAlY coating like MDC-34H which had more of the beta phase. A typical high Al content MCrAlY will have good oxidation resistance but poor ductility because of the high amount of beta phase; whereas, a low Al content MCrAlY will have good ductility but relatively poor oxidation resistance. Coatings produced in accordance with this invention demonstrate excellent oxidation resistance, and those of relatively low aluminum content exhibit excellent ductility. The coatings of the invention with both aluminum and high amounts of tantalum have significantly enhanced oxidation resistance and therefore are valuable when ductility is relatively unimportant. The coatings also reveal improved oxidation resistance compared to an advanced platinum aluminide coating like LDC-2E, and a simple aluminide coating such as MDC-1A.

The performance of the articles coated pursuant to this example was also evaluated by means of a water

TABLE I

| | PROPERTIES OF MCrAlY COATINGS | | | | | | | | | | | |
|---|---|---|---|---|---|---|---|---|---|---|---|---|
| COATING SYSTEM | COMPOSITIONS (WT %) | | | | | | | | | AVERAGE LIFE[1] HOURS | | CRACKING AFTER WATER SPRAY QUENCH TEST | IMPACT ENERGY REQUIRED TO PRODUCE CRACKS[2] OR CHIPS (IN.-LBS.) |
| | Ni | Co | Cr | Al | Ta | Mn | W | La | Y | IN 738 SUBSTRATE | MAR-M509 SUBSTRATE | | |
| UTC[3] NiCoCrAlY | Bal | 23 | 18 | 13 | | | | | | 0.3 | 100 | 190 | No | 3.0 |
| MDC-35A | Bal | 15 | 20 | 12 | 2.5 | | | | 0.5 | | 107 | | No | 3.0 |
| MDC-34H | Bal | 10 | 20 | 17 | | | | | | 0.6 | 186 | | Yes | 1.0 |
| MDC-35J | Bal | 15 | 20 | 12 | 7.0 | | | | 0.5 | | 230 | | Yes | 1.0 |
| MDC-1A | | | | Simple Aluminide | | | | | | | 23[4] | | Yes | 0.5 |
| LDC-2E | | | | Platinum Aluminide | | | | | | | 135 | | Yes | 2.0 |
| MDC-35B | Bal | 15 | 20 | 12 | 2.5 | | | 1.5 | 0.5 | | 124 | 237 | No | 3.0 |
| MDC-35C | Bal | 15 | 20 | 12 | | 2.5 | | | 0.5 | | 110 | | No | 3.0 |
| MDC-35D | Bal | 15 | 20 | 12 | 2.5 | 2.5 | | | 0.5 | | 175 | 238 | No | 2.0–3.0 |
| MDC-35E | Bal | 15 | 20 | 12 | 2.5 | | | 1.5 | 0.5 | | 125 | | No | 3.0 |
| MDC-35M | Bal | 21 | 16 | 12 | 2.5 | 1.7 | | 1.0 | | | 230 | | No | 3.5–4.0 |

[1]Rig Cycle: 2100° F./2 Min. + 1750° F./4 Min. + 2100° F./2 Min. + Cool/2 Min. (5 ppm salt).
[2]Results obtained from drop weight test.
[3]Composition conforming to United Technologies Pat. No. 3,928,026.
[4]Result from one test.

A 500× photomicrograph of one of the coatings (MDC-35D) is shown in FIG. 1; the thicknesses of the coatings typically were 0.004 inches. The optical micrograph reveals the presence of a ductile matrix of gamma (Ni, Cr) containing a dispersion of beta (Ni, Co) Al intermetallic compound. The proportion of beta phase in MDC-34H was greater than in some of the other coatings because of its high aluminum content. Electron microprobe analysis showed that the coating chemistry was not very much different from that of the chemistry of the powder.

The performance of the articles coated pursuant to this example was evaluated using a 0.7 Mach burner rig. The testing cycle was 2100° F./2 minutes; 1750° F./4 minutes; 2100° F./2 minutes; air cool/2 minutes. Five (5) ppm salt solution was injected into the combustion products of JP5 fuel containing 0.2% sulfur. This cycle simulates the gas turbine engine environment for turbine blades and vanes, it highlights the oxidation phenomenon, and it imposes significant thermal stresses on the protective system.

spray quench test and drop weight impact testing. The former test is a measure of coating ductility and consists of heating the coated airfoil sections to 2100° F.±100° F., holding the articles at this temperature for time periods of 15 minutes to two hours, and then quenching them in a water spray. It is to be noted that the thermal strains that are generated in this type of test are less severe than those which may be encountered in advanced air-cooled aircraft engine gas turbine blades and may be similar to those experienced in other types of gas turbine blades. The latter test is also a measure of coating ductility, high-lighting the handling characteristics of the coated parts. It consists of dropping a one-pound indentor from several heights onto the trailing edge of a coated airfoil section with the energy of impact being equal to the height in terms of inch-lbs. The tested specimens are evaluated, using a stereo microscope at 20× magnification, for appearance of defects (chips and cracks). The energy of impact necessary to produce cracks or chips on the trailing edges is taken as a measure of coating ductility. The higher this energy, the greater the coating ductility.

The results from these two tests are also shown in Table I. It is seen that some of the articles coated pursuant to the present invention do not show any cracks after the water spray quench test unlike the high Al MCrAlY or the aluminides, thereby confirming the ductility of these coatings. Drop weight tests done on the trailing edges of coated airfoil sections indicate that some of the articles coated pursuant to this example are able to withstand greater impact energy than high Al MCrAlY or aluminide coated articles. This also confirms that some of the coatings in accordance with this invention are ductile.

The Table also illustrates the value of the use of the metal mixture of the invention. Thus, MDC-35A contains only tantalum and MDC-35C contains only manganese, while MDC-35B, D, E, and M contain the mixture. While MDC-35A and MDC-35C demonstrate a life increase, the most significant improvement in coating life while still retaining good ductility is exhibited by the mixture.

On the other hand, MDC-35J illustrates that a high tantalum level, even in the absence of manganese and tungsten, dramatically increases high temperature oxidation resistance. The results achieved with this alloy show that ductility was reduced. We have found, however, that alloys with such dramatically increased high temperature oxidation resistance are valuable in applications where thermal and mechanical strains peak at temperatures above 1800° F. and that ductility is a relatively unimportant property in such applications.

We have also found that increasing aluminum levels in accordance with the present invention to as high as 30 weight percent imparts increasingly greater oxidation resistance to the coating. The NiAl phase, which contributes to the oxidation resistance of the coating, locally contains 31 weight percent of aluminum. In accordance with a preferred embodiment of the invention, a coating may be sprayed that consists essentially of a single phased microstructure comprised of alloyed beta phase instead of the two phases, beta and gamma. Such coatings are ideal for applications that encounter severe oxidation and must withstand significant thermal strains only at temperatures above 1800° F.

An especially preferred coating composition and coated superalloy component according to the present invention includes hafnium and is particularly beneficial in the case of directionally solidified or single crystal substrates. These coating compositions preferably include 10% to 30% cobalt, 10% to 30% chromium, 10% to 20% aluminum, 1% to 10% tantalum, 0.1% to 2% hafnium, up to 5% manganese, up to 2% of a reactive metal selected from lanthanum, yttrium, and other rare earths, and the balance nickel; more preferably 20% to 24% cobalt, 17% to 19% chromium, 13% to 15% aluminum, 2% to 4% tantalum, 0.3% to 0.8% hafnium, 1.0% to 1.5% manganese, 0.2% to 1.0% lanthanum, yttrium, or other rare earths, and the balance nickel. Where hafnium is present in the coating, the amount of lanthanum, yttrium, or other rare earths may be reduced substantially or eliminated without affecting the performance of the coating in certain environments.

Figure 2:
FIG. 2 comprises a 400× magnification of the microstructure of a preferred coating and a directionally solidified substrate in accordance with the invention.
Figure 3:
FIG. 3 is a 2.5× magnification of a coated test pin having the microstructure illustrated in FIG. 2.

An example of this embodiment is illustrated in FIGS. 2 and 3 of the drawings. These Figures illustrate a directionally solidified nickel-base superalloy known as Rene 150, having a nominal composition of 12.0 Co, 5.0 Cr, 5.5 Al, 1.0 Mo, 5.0 W, 6.0 Ta, 2.2 V, 1.5 Hf, 3.0 Rh, 0.06 C, 0.015 B, 0.03 Zr, and balance Ni, coated with a composition consisting of 23% cobalt, 18.5% chromium, 14.1% aluminum, 2.5% tantalum, 0.6% hafnium, 1.4% manganese, 0.4% lanthanum, and the balance nickel. The coated components in the drawings were subjected to 1000 hours of 2100° F. static oxidation exposure, and the coating composition was found to be extremely stable. There was very little oxidation attack on the coating system, as evidenced by the amount of beta phase consumed by the oxidation exposure in FIG. 2. This result is surprising in view of the relatively poor oxidation resistance of Rene 150 due in part to its vanadium content. The poor oxidation resistance of the substrate alloy is demonstrated by the significant degree of metal loss evident in the uncoated end of the pin in FIG. 3.

The coating compositions falling within the scope of this invention are suitable for a wide variety of superalloy substrates, and the particular examples of substrates referred to herein are not to be considered limiting. Thus, any substrate which can be satisfactorily coated with the composition of this invention by means of plasma spraying or any other suitable coating technique, and which will retain the coating in a satisfactory manner where elevated temperature performance is contemplated, will be suitable.

Coating compositions falling within the broader ranges expressed herein are generally useful for applications where oxidation resistance is desired. As explained, applicants have also discovered that certain more limited ranges within the broad ranges provide particularly suitable performance for oxidation-prone applications.

It will be apparent to those skilled in the art that various modifications and variations could be made in the coating compositions and coated components of the invention without departing from the scope or spirit of the invention.

We claim:

1. In a nickel, cobalt, or iron base superalloy component, the improvement comprising a coating composition on said component consisting essentially by weight of from 6 to 30% aluminum, 0.01 to 15% tantalum, 5 to 50% chromium, 0.1 to 10% manganese, up to 5% tungsten, up to 12% silicon, up to 10% hafnium, and the balance selected from the group consisting of nickel, cobalt, and iron and combinations thereof.

2. A component according to claim 1, wherein said composition includes 10 to 20% aluminum, 1 to 10% tantalum, and 10 to 40% chromium.

3. A component according to claim 2, wherein said composition includes 12 to 17% aluminum, 2 to 7% tantalum, and 15 to 20% chromium.

4. In a nickel, cobalt, or iron base superalloy component, the improvement comprising a coating composition on said component consisting essentially by weight of from 5 to 35% cobalt, 6 to 25% aluminum, 0.01 to 15% tantalum, 5 to 35% chromium, 0.1 to 10% manganese, up to 5% tungsten, up to 12% silicon, up to 10% hafnium and the balance nickel.

5. A component according to claim 4, wherein said composition includes 10 to 30% cobalt, 10 to 20% aluminum, 1 to 10% tantalum, and 10 to 30% chromium.

6. A component according to claim 5, wherein said composition includes 15 to 25% cobalt, 12 to 17% aluminum, 2 to 7% tantalum, and 15 to 20% chromium.

7. In a nickel, cobalt, or iron base superalloy component, the improvement comprising a coating composition on said component consisting essentially by weight of from 3 to 25% aluminum, 0.01 to 12% tantalum, 5 to 40% chromium, up to 10% manganese, up to 5% tungsten, up to 12% silicon, up to 10% hafnium, and the balance cobalt.

8. A component according to claim 7, wherein said composition includes 10 to 20% aluminum, 1 to 10% tantalum, and 10 to 30% chromium.

9. A component according to claim 8, wherein said composition includes 12 to 17% aluminum, 2 to 7% tantalum, and 15 to 20% chromium.

10. A component according to claim 1, 4, or 7, wherein said composition includes up to 5% by weight of a reactive metal selected from the group consisting of lanthanum, yttrium, and the other rare earths.

11. A component according to claim 10, wherein said reactive metal is present in an amount between 1 and 3% by weight of the composition.

12. A component according to claim 1, 4, or 7, wherein said composition includes up to 5% by weight of a member selected from the group consisting of rare earth oxide particles and refractory metal oxide particles.

13. A component according to claim 12 wherein said oxide particles are present in an amount between 0.05 and 2.0% by weight.

14. A component according to claim 1, 4, or 7 wherein the tantalum is present in an amount between 2.0 and 5.0% by weight, and including from 2.0 to 5.0% by weight of tungsten or manganese or a combination thereof.

15. A component according to claim 14 wherein the amount of tungsten does not exceed 1.5% by weight of the coating.

16. A component according to claim 14, wherein said composition includes from 10 to 20% by weight cobalt, from 5 to 25% by weight chromium, and from 10 to 18% by weight aluminum.

17. A component according to claim 1, 4, or 7, wherein said composition includes from about 0.05 up to about 15% by weight of a noble metal selected from the group consisting of platinum rhodium, and palladium.

18. A component according to claim 1, wherein said composition includes up to about 5% by weight titanium.

19. A component according to claim 1, 4, or 7, wherein said composition includes at least one of tungsten and manganese, and the tantalum is present in an amount that is at least 20% by weight of the amount of tantalum, tungsten, and manganese, said composition containing at least about 0.5% by weight tantalum and at least about 0.5% by weight of tungsten or manganese or a combination thereof.

20. A component in accordance with claim 1, 4, or 7, wherein said manganese is present in said composition in an amount between 1 and 4%.

21. In a nickel, cobalt, or iron base superalloy component, the improvement comprising a coating composition on said component consisting essentially by weight of from 10 to 50% chromium, 6 to 15% aluminum, 1 to 15% of a metal mixture, and the balance selected from the group consisting of nickel, cobalt, and iron, and combinations thereof, said metal mixture consisting essentially of at least 20% by weight tantalum and the balance tungsten and manganese, said coating containing at least about 0.5% by weight tantalum and at least about 0.5% manganese.

22. A component according to claim 21 wherein the amount of tungsten in said composition does not exceed 1.5% by weight of the coating.

23. In a nickel, cobalt, or iron base superalloy component, the improvement comprising a coating composition on said component consisting essentially by weight of from 10 to 50% chromium, 6 to 15% aluminum, 0.01 to 8% tantalum, 0.1 to 10% manganese, up to 5% tungsten, up to 12% silicon, up to 10% hafnium, and the balance selected from the group consisting of nickel, cobalt, and iron, and combinations thereof.

24. In a nickel, cobalt, or iron base superalloy component, the improvement comprising a coating composition on said component consisting essentially by weight of from 5 to 35% cobalt, 10 to 35% chromium, 5 to 15% aluminum, 0.01 to 8% tantalum, 0.1 to 10% manganese, up to 5% tungsten, up to 12% silicon, up to 10% hafnium, and the balance nickel.

25. A component according to claim 1, 4, or 7 wherein said coating consists essentially of a single phased microstructure of alloyed beta phase.

26. A component according to claim 4 wherein said composition includes 10 to 30% cobalt, 10 to 30% chromium, 10 to 20% aluminum, 1 to 10% tantalum, 0.1 to 2% hafnium, up to 5% manganese, and up to 2% of a reactive metal selected from the group consisting of lanthanum, yttrium, and the other rare earths.

27. A component according to claim 26 wherein said composition includes 20 to 24% cobalt, 17 to 19% chromium, 13 to 15% aluminum, 2 to 4% tantalum, 0.3 to 0.8% hafnium, 1.0 to 1.5% manganese, and 0.2 to 1.0% of a reactive metal selected from the group consisting of lanthanum, yttrium, and the other rare earths.

28. A component according to claim 1, 4, or 7 wherein said coating is present in a thickness between 0.0001 and 0.1 inches.

29. A component according to claim 1, 4, or 7, including a superalloy substrate, and at least two coating layers applied to said substrate, said composition comprising either or both of said layers.

30. A component according to claim 1, 4, or 7 wherein said coating comprises a bond coat for a thermal barrier coating.

31. A component according to claim 28, 31, or 34 wherein said coating is deposited by plasma spraying.

32. A component in accordance with claim 26, wherein said superalloy component to which said coating composition is applied is selected from directionally solidified and single crystal substrates.

33. In a nickel, cobalt, or iron base superalloy component, the improvement comprising a coating composition on said component consisting essentially by weight of from 6 to 30% aluminum, 0.01 to 15% tantalum, 5 to 50% chromium, 16 to 35% cobalt, up to 10% manganese, up to 5% tungsten, up to 12% silicon, up to 10% hafnium, and the balance nickel.

34. A component according to claim 33, wherein said composition includes 6 to 25% aluminum and 5 to 35% chromium.

35. In a nickel, cobalt, or iron base superalloy component, the improvement comprising a coating composition on said component consisting essentially by weight of from 6 to 30% aluminum, 0.01 to 15% tantalum, 15% chromium, up to 10% manganese, up to 5% tungsten, up to 12% silicon, up to 10% hafnium, and the balance selected from the group consisting of nickel, cobalt, and iron and combinations thereof.

36. A component according to claim 7, wherein said composition includes 28 to 30% chromium, 8 to 10% aluminum, 2 to 4% tantalum, 1.5 to 2% manganese, and up to 1.5% by weight of a reactive metal selected from the group consisting of lanthanum, yttrium, and the other rare earths.

37. A component according to claim 4, wherein said composition includes 32 to 35% chromium, 6 to 8% aluminum, 1.5 to 3.5% tantalum, 1.5 to 2% manganese, and up to 1.5% by weight of a reactive metal selected from the group consisting of lanthanum, yttrium, and the other rare earths.

* * * * *

UNITED STATES PATENT AND TRADEMARK OFFICE
CERTIFICATE OF CORRECTION

PATENT NO. :  4,447,503

DATED :  May 8, 1984

INVENTOR(S) :  Louis E. Dardi and Srinivasan Shankar

It is certified that error appears in the above—identified patent and that said Letters Patent is hereby corrected as shown below:

Claim 17, line 4, insert a comma (,) after "platinum".

Claim 35, line 4, change "15%" (second occurrence) to --15 to 50%--.

Signed and Sealed this

Eighteenth Day of September 1984

[SEAL]

Attest:

GERALD J. MOSSINGHOFF

Attesting Officer

Commissioner of Patents and Trademarks